(12) United States Patent
Krämer (10) Patent No.: US 10,511,069 B2
(45) Date of Patent: Dec. 17, 2019

(54) BATTERY

(71) Applicant: Thomas Krämer, St. Julian's (MT)

(72) Inventor: Thomas Krämer, St. Julian's (MT)

(73) Assignee: E-Seven Systems Technology Management Ltd, Valletta (MT)

( * ) Notice: Subject to any disclaimer, the term of this patent is extended or adjusted under 35 U.S.C. 154(b) by 0 days.

(21) Appl. No.: 16/208,180

(22) Filed: Dec. 3, 2018

(65) Prior Publication Data

US 2019/0109352 A1    Apr. 11, 2019

Related U.S. Application Data

(63) Continuation of application No. PCT/EP2017/063330, filed on Jun. 1, 2017.

(30) Foreign Application Priority Data

| | | |
|---|---|---|
| Jul. 6, 2016 | (DE) | 10 2016 112 430 |
| Jul. 6, 2016 | (DE) | 10 2016 112 431 |
| Aug. 30, 2016 | (DE) | 20 2016 104 759 U |
| Sep. 5, 2016 | (DE) | 20 2016 107 025 U |
| Nov. 2, 2016 | (DE) | 10 2016 120 834 |
| Nov. 2, 2016 | (DE) | 10 2016 120 835 |
| Nov. 2, 2016 | (DE) | 10 2016 120 838 |

(Continued)

(51) Int. Cl.
*H01M 10/653* (2014.01)
*H01M 2/10* (2006.01)
(Continued)

(52) U.S. Cl.
CPC ....... *H01M 10/653* (2015.04); *H01M 2/0212* (2013.01); *H01M 2/0285* (2013.01);
(Continued)

(58) Field of Classification Search
None
See application file for complete search history.

(56) References Cited

U.S. PATENT DOCUMENTS

2013/0122341 A1    5/2013  De Paoli et al.

FOREIGN PATENT DOCUMENTS

| | | |
|---|---|---|
| DE | 10 2007 063 195 A1 | 6/2009 |
| DE | 10 2008 034 699 A1 | 1/2010 |

(Continued)

*Primary Examiner* — Wyatt P McConnell
(74) *Attorney, Agent, or Firm* — Reinhart Boerner Van Deuren P.C.

(57) ABSTRACT

The invention relates to a battery having a cell arrangement. The cell arrangement has a plurality of battery cells. The cell arrangement has battery sections, each including a battery cells. Between adjacent battery sections, an at least partially electrically and thermally conductive contacting section element having a first side and a second side is arranged. The end terminals facing the first side of a contacting section element are electrically and thermally conductively connected to a contacting section of this first side. The end terminals facing the second side of the contacting section element are electrically and thermally conductively connected to a contacting section of this second side. End terminals of the battery cells are electrically and thermally conductively connected to each other via the contacting section element such that an electric current and a heat flow are distributed throughout the entire cell assembly.

21 Claims, 6 Drawing Sheets

(30) Foreign Application Priority Data

Nov. 2, 2016 (DE) .......................... 10 2016 120 839
Nov. 2, 2016 (DE) .......................... 10 2016 120 841

(51) Int. Cl.
*H01M 2/20* (2006.01)
*H01M 10/04* (2006.01)
*H01M 10/6555* (2014.01)
*H01M 10/613* (2014.01)
*H01M 2/02* (2006.01)
*H01M 2/30* (2006.01)
*H01M 10/643* (2014.01)

(52) U.S. Cl.
CPC ......... *H01M 2/1077* (2013.01); *H01M 2/206* (2013.01); *H01M 2/30* (2013.01); *H01M 10/0481* (2013.01); *H01M 10/613* (2015.04); *H01M 10/6555* (2015.04); *H01M 2/105* (2013.01); *H01M 2/204* (2013.01); *H01M 10/643* (2015.04)

(56) References Cited

FOREIGN PATENT DOCUMENTS

| JP | 2013-532890 A | 8/2013 |
| JP | 2016-507872 A | 3/2016 |
| WO | WO 2014/111233 A1 | 7/2014 |
| WO | WO 2015/036322 A1 | 3/2015 |

BATTERY

CROSS-REFERENCE TO RELATED PATENT APPLICATIONS

This patent application is a continuation of PCT/EP2017/063330, filed Jun. 1, 2017, which claims priority to:
German Application No. 10 2016 110 348.9, filed Jun. 3, 2016;
German Application No. 10 2016 112 430.3, filed Jul. 6, 2016;
German Application No. 10 2016 112 431.1, filed Jul. 6, 2016;
German Application No. 20 2016 104 759.5, filed Aug. 30, 2016;
German Application No. 20 2016 107 025.2, filed Sep. 5, 2016;
German Application No. 10 2016 120 834.5, filed Nov. 2, 2016;
German Application No. 10 2016 120 835.3, filed Nov. 2, 2016;
German Application No. 10 2016 120 838.8, filed Nov. 2, 2016;
German Application No. 10 2016 120 839.6, filed Nov. 2, 2016; and
German Application No. 10 2016 120 841.8, filed Nov. 2, 2016, the entire teachings and disclosure of which are incorporated herein by reference thereto.

FIELD

The present invention relates to a battery having a cell arrangement, wherein the cell arrangement has a plurality of battery cells, wherein the cell arrangement has at least two battery sections and each battery section consists of a plurality of battery cells, wherein each battery cell has a first and a second end terminal and wherein between the first and the second end terminal of each battery cell a battery cell longitudinal axis extends, wherein the battery cell longitudinal axes of each battery section are each arranged parallel to each other, and wherein the battery sections are arranged adjacent to each other.

BACKGROUND

Batteries are well known in the prior art and are used for many purposes. From the prior art, batteries of different sizes with a different number of battery cells connected in parallel and in series are known, whereby the capacity provided by the battery and the voltage provided by the battery can be adapted to the respective application. One important application, in particular for the present invention, is the use of batteries for electrically powered motor vehicles. Such batteries may however also be used in many other areas.

The battery cells may be primary or secondary cells, wherein the battery is often referred to as a battery pack when using secondary cells. From the prior art, different battery cell types are known, which differ mainly by the electrode materials and electrolytes used for the battery cells. At present, battery packs with lithium-ion battery cells and nickel-metal hybrid battery cells are used in many applications. Usually, battery cells of a single battery cell type are used for a battery. It is also possible and useful for some applications to use battery cells of different battery cell types.

Especially for large batteries, for example for operation of electrically driven motor vehicles, in which a plurality of battery cells is used, inter alia during charging with comparatively high currents, areas with high temperatures occur within the battery, by which the charging or discharging of the battery cells arranged in the high temperature area and their lifetime is affected. The areas of elevated or high temperatures are also referred to as temperature hot spots. The temperature distribution within the cell arrangement is influenced by a variety of factors such as the type of battery cells used, the relative arrangement of the battery cells relative to each other, the charge or discharge current flowing through the battery cells, and the aging state of the respective battery cell.

It is considered an object of the invention to provide a battery, wherein the occurrence of temperature hot spots is avoided in the battery.

BRIEF SUMMARY

According to the invention, the object is achieved in that between at least two adjacent battery sections, an at least partially electrically and thermally conductive contacting section element having a first side and a second side is arranged, that has each on the first side and on the second side at least one electrically and thermally conductive contacting section, wherein the battery sections are arranged relative to each other such that to each battery section a plane can be assigned that extends perpendicular to the battery cell longitudinal axes of the battery cells of the battery section through at least one of the battery cells of the battery section, and wherein battery sections adjacent to the battery section are not intersected by this plane, wherein the end terminals facing the first side of that contacting section element are electrically and thermally conductively connected to the at least one contacting section of this first side, wherein the end terminals facing the second side of this contacting section element are electrically and thermally conductively connected to the at least one contacting section of the second side, and wherein end terminals of the battery cells are electrically and thermally conductively connected to each other via the contacting section element such that an electric current and a heat flow are distributed throughout the cell assembly.

The battery cells of different battery sections are arranged such that they never are completely arranged side by side. Individual battery cells of different battery sections may be arranged laterally offset from battery cells of adjacent battery sections. However, the battery cells of adjacent battery sections cannot completely be arranged side by side, as otherwise there is no plane perpendicular to the battery cell longitudinal axes of a battery section through at least one of the battery cells of the battery section that also does not intersect battery cells of adjacent battery sections.

A large part of the thermal energy produced in the battery cells is conducted through the entire cell arrangement via the end terminals of the battery cells in the configuration according to the invention. Herein, a distribution of electrical and thermal energy between the battery cells occurs via the contacting section elements. The end terminals of the batteries are particularly suitable for transmitting the thermal energy, as the end terminals are thermally conductively connected to an interior of the battery and also consist of a thermally and electrically highly conductive material. In contrast, cooling and heat dissipation via a cell jacket of a battery cell is often less efficient, as the cell jacket is usually made of a thermally and electrically poorly conductive material.

If the battery cells are uniformly dimensioned in terms of their electrical and thermal conductivity, a uniform distribution of electric current and the heat flow within the battery cells is obtained. In case the thermal conductivity and/or the resistance of one or more battery cells is reduced, it is achieved by means of the configuration that an electric current and a heat current is distributed evenly within the battery at least via the remaining battery cells. A uniform distribution of the electric current and the heat current helps to avoid hot spots within the battery.

According to the invention, it is possible to distribute thermal energy from the battery cells across the individual battery sections between the battery sections and the individual battery cells. Furthermore, due to the configuration according to the invention, it is possible to distribute the current uniformly to the battery cells. A uniform distribution of current contributes to a uniform heat distribution within the battery, as a battery cell is heated more by a higher current. If the temperature of a battery cell changes, its resistance also changes. Thus, the electrical resistance and the temperature of the battery cells within a battery influence each other. Therefore, it is especially important to distribute both the electric current and the thermal energy within a battery uniformly across its battery cells.

According to the invention, between two battery sections in each case one contacting section element is arranged. This is an electrically and thermally at least partially conductive body. This has, at least in sections, areas that are suitable as contacting sections. Battery cells of the battery are electrically and thermally conductively connected to the contacting section element. The contacting section element may have different geometric configurations. By means of the contacting section element, a contact of the battery cells and a distribution of an electric current and a heat flow between the battery cells electrically and thermally conductively connected by the contacting section element by means of the contacting section element are enabled. The contacting section element is preferably rigid.

The battery cells within each battery section may be aligned accordingly with respect to their battery polarity. Thus, all of the battery cells within a battery section may be aligned so that they each contact a first contacting section element with a first end terminal that forms a positive battery terminal, and contact a second contacting section element with a second end terminal that forms a negative battery terminal. However, the battery cells do not necessarily have to be aligned coincidently with respect to their battery polarity. Thus, it is also possible that both positive battery terminals as well as negative battery terminal abut to a contacting section element.

It is preferred if the end terminals connected to the at least one contacting section of the first side are interconnected electrically and thermally conductively with one another via the contacting section element, wherein the end terminals connected to the at least one contacting section of the second side are interconnected electrically and thermally conductively with one another via the contacting section element, and wherein the end terminals connected to the at least one contacting section of the first side are electrically and thermally conductively interconnected connected to the at least one contacting section of the second side via the contacting section element, such that the battery cells are electrically conductively connected to each other in an electrical series and parallel connection and in addition are thermally conductively connected to each other. It has been found out that with such a circuit, a particularly uniform distribution of heat and electric current across all battery cells of the battery is obtained.

Preferably adjacent battery sections are spaced apart from one another in the direction of a battery cell longitudinal axis of one of the adjacent battery sections. The distance between the battery sections can be established by the contacting section element. According to this spatial configuration, the battery cells of different battery cells cannot be arranged in a direction perpendicular to the battery cell longitudinal axes next to each other, but are always spaced apart offset from each other in the direction of a battery cell longitudinal axis of the adjacent battery sections.

According to the invention, it is also possible that battery cells of adjacent battery sections are arranged such that at least one axis extending through a battery cell of a battery section, which axis extends parallel to a battery cell longitudinal axis of this battery cell, intersects a battery cell in an adjacent battery section. Thus, the battery cells of adjacent battery sections are arranged relative to each other so that cross sections of the battery cells at least partially overlap when a cross section of a battery cell is displaced in the direction of the battery cell longitudinal axis of this battery cell.

Furthermore, it can be provided according to the invention that battery cells of adjacent battery sections abut opposite of each other to a contacting section element. This assumes that the arrangement of the battery cells in adjacent battery sections matches each other. According to the invention, however, it is also possible that the battery cells are arranged differently in adjacent battery sections relative to each other. Accordingly, some or all of the battery cells may abut to the contacting section element such that in each case no battery cell of an adjacent battery section abuts on an opposite side of the contacting section element.

It is particularly preferred if the battery cells of all battery sections of the battery have battery cell longitudinal axes aligned parallel to each other. Thus, all the battery cells in a battery have a matching alignment towards a battery axis. Due to this construction, a battery constructed in this way can absorb forces which are exerted on the battery in the direction of the battery axis particularly well. Such a construction is particularly advantageous when the battery cells of adjacent battery sections are all arranged opposite each other on the contacting section element. Thus, forces from a battery cell in the direction of battery axis are transmitted via the contacting section element in an advantageous manner to an opposite battery cell of an adjacent battery section.

If all the battery cells of the battery have battery cell longitudinal axes aligned parallel to each other, it is advantageous if the battery sections of the battery are arranged one behind the other along a battery axis, which runs parallel to the battery cell longitudinal axes. The battery sections are thus not arranged to each other in a direction perpendicular to this battery axis. Forces within the battery can be transmitted particularly well along the battery cell longitudinal axes of the battery cells throughout the entire cell assembly.

It is especially beneficial if all battery sections of the battery lie in a battery compartment, wherein a battery compartment cross-section of the battery compartment perpendicular to the battery axis corresponds to a maximum battery section cross-section of a battery section envelope of a battery section perpendicular to the battery axis, wherein the maximum battery section cross-section is the battery section cross-section of a battery section that includes all battery section cross-sections of all battery sections along the battery axis. The battery section envelopes are formed by lateral surfaces of the respective outer battery cells of the respective battery section. Thus, a cross-section of a battery section is defined by a battery section, whose area is either equal to or larger than the area of the cross-sections of all other battery sections of the battery.

Preferably, the first end connections of the battery cells form battery plus terminals and the second end connections of the battery cells form battery minus terminals, wherein the battery cells of a battery section are each connected to a contacting section element exclusively via battery plus terminals or exclusively via battery minus terminals. Herein, a contacting section element is preferably contacted on a first side exclusively by battery plus terminals and on a second side exclusively by battery minus terminals. This allows for an electrical and thermal parallel and series connection across all battery cells within the battery and across all contacting section elements within the battery. Below, first end terminals of the battery cells that form battery plus terminals are referred to as positive end terminals. Second end terminals of the battery cells forming battery negative terminals will be referred to hereinafter as negative end terminals.

According to a particular embodiment of the invention, the contacting section element is configured plate-shaped. A plate-shaped contacting section element is characterized by a small depth in relation to its height and width. A plate-shaped contacting section element can particularly easily be arranged between adjacent battery sections to connect these with each other electrically and thermally conductive. All contacting sections of a plate-shaped contacting section element on one side of the contacting section elements run in a plane. Alternatively, the contacting section element may be not plate-shaped, but only have planar sections which are arranged stepwise offset from each other on the contacting section element. In this case, it is advantageous to have a contacting section element which has contacting sections on both sides, which are arranged staggered from one another in a stepped manner. The contacting section element may be configured such that contacting sections provided thereon on one side of the contacting section are arranged in two different planes or in more than two different planes.

Preferably, a pressure plate is arranged at each of a battery start region and a battery end region of the cell arrangement, wherein the pressure plates are connected to each other via tension elements, and thereby the battery cells abutting to the at least one contacting segment element are pressed to the at least one contacting segment element, and wherein the battery start region and the battery end region are defined by end terminals at a first end and a second end of the cell assembly. The components within the cell assembly are thereby pressed together. Herein, the pressure plates exert a contact force on the battery cells. According to the invention, the pressure plate may exert the contact pressure at the battery start section or on the battery end section directly on the battery cells. The pressure plate may abut directly to the end terminals of the battery cells. Alternatively, the pressure plate can exert the contact force at the battery start section or at the battery end section also indirectly on the battery cells. Between the pressure plate and the battery cells, an additional layer may be provided according to the invention. This additional layer may be configured electrically non-conductively and/or elastically. Furthermore, between a pressure plate and a battery start region, respectively a battery end region, a contacting section element may be arranged.

According to the invention, the pressure plates can be formed planar, but different configurations of pressure plates are also possible. The tension elements are each connected to the pressure plates. Herein, the tension elements are clamped in such a way between the pressure plates that they exert a tensile force on the pressure plates. Due to the tensile force, the pressure plates can in turn exert the already described contact pressure on the cell arrangement. The contact force is transmitted across all battery sections of the cell assembly within the battery. As a result, the battery cells are particularly well contacted with the at least one contacting section element within the cell assembly, because a contacting area between the contacting section elements and the end terminals of the battery cells is increased by a high contact force.

The tension elements can be designed as rods, as tubes or as other elongated elements. Preferably, the rods are made of a metal, most preferably made of steel. However, the rods may alternatively be made of a particularly stable plastic or of a composite material.

By a pressing together, an electric current and a heat flow can be distributed particularly well within the battery. Furthermore, the battery is stabilized in a particular manner, such that it can withstand strong mechanical loads. This is especially advantageous if a battery is regularly exposed to such mechanical stresses.

Preferably, the battery cells in the battery sections are arranged in first and second cell planes, wherein the first and the second cell planes are arranged alternately within a battery section, wherein along each cell plane at least two battery cells are arranged, wherein between adjacent battery cells in the first cell plane and adjacent battery cells in the second cell plane an equal distance is predetermined, wherein the battery cells in the first cell plane are arranged offset from the battery cells in the second cell plane, and wherein the battery cells in all battery sections are arranged similarly, such that within the lateral surface at least one outer passage section is formed through which one of the tension elements is passed. The battery cells in a first cell plane or in a second cell plane can be spaced apart from one another as desired. They can be spaced apart from each other so far that inner passage sections are present in the cell assembly, through which the tension elements can be passed.

According to a further embodiment of the invention, the battery cells abut against two other battery cells in corner regions of the battery sections and on three other battery cells in edge regions of the battery sections, and wherein all battery cells that are not arranged in a corner region or an edge region abut to six other battery cells and wherein each contacting section has an according cell arrangement, such that within the lateral surface at least one outer passage section is formed through which one of the tension elements is passed. According to this arrangement, the battery cells are arranged directly adjacent to each other, whereby they are particularly well packed together. It is thus possible to arrange a particularly large number of battery cells in each battery section. Herein, outer passage sections between the battery cells and a lateral surface surrounding the battery cells are obtained. However, according to the invention, deviating arrangements of the battery cells within the battery sections are also possible.

According to the invention, in each case at least one battery cell can be removed within the battery sections, so that at least one inner passage section is formed within the lateral surface, through which one of the tension elements is passed. The removal of an additional battery cell is possible both in a staggered arrangement of the battery cells as well as in any other arrangement of the battery cells within the battery. As a result, additional space can be obtained within the battery, which can serve as a passage section.

It is advantageous if the pressure plates are configured as metal plates. Metal plates are sufficiently stable so that a tensile force can be transmitted from the tension elements to the cell assembly. The metal plates can be made with different thicknesses depending on a desired tensile force. If a high tensile force is desired, the metal plate must be made particularly thick. Preferably, the metal plate is 3 to 20 mm in thickness, most preferably 5 mm in thickness. According to the invention, the metal plates can be formed of copper, aluminum or other very highly thermally conductive material. Alternatively, it is possible not to make the pressure plates of metal. Hence, the pressure plates may be made of a hard plastic according to the invention.

Preferably, the tension elements are passed through recesses in the pressure plates, wherein the tension elements are bolted into the pressure plate and/or are bolted to the pressure plates by means of nuts. A threaded connection allows a precise adjustment of the tensile forces exerted by the tension elements on the pressure plates. However, according to the invention, other fixing means can also be used in order to fix the tension elements to the recesses in such a way that the tension elements exert a tensile force on the pressure plates. According to the invention, it is possible that the tension elements are made of an electrically non-conductive material. In this way, it can be prevented that an electric current is passed through the tension elements. This is especially important for embodiments of the invention in which the pressure plates carry electrical current. Alternatively, it is possible that the tension members are coated with an electrically non-conductive material to electrically isolate the tension members.

Preferably, the tension members are connected to the pressure plates in such a way that on each pressure plate by the tension members connected to it a compressive force of at least 50 N, preferably at least 100 N and particularly preferably at least 200 N in the direction of the battery sections is exerted. As a result, the battery cells and the contacting section elements within the battery are particularly well connected to each other in an electrically and thermally conductive manner. In addition, the cell arrangement is particularly stable when a correspondingly high tensile force is exerted on the cell assembly.

At least one pressure plate preferably has cooling fins. Cooling fins increase the surface area of the pressure plates such that the pressure plates may dissipate heat better. Thus, from the end faces of the battery, heat from the cell assembly may advantageously be dissipated via the pressure plates. Cooling fins are particularly suitable when the pressure plates made of a metal such as copper or aluminum.

Preferably, end terminals of a battery section abut electrically and thermally conductively directly to end terminals of an adjacent battery section. It is very particularly preferred that positive end terminals abut directly to negative end terminals of an adjacent battery section. Accordingly, two or more battery cells are connected in series, without direct adjacent battery cells being separated from each other by a contacting section element. Such an arrangement may be provided when a sufficient distribution of an electric current and a heat flow within a battery is also possible with a small number of contacting section elements within the cell arrangement. Whether this is the case is decisively determined by capacitive and other properties of the battery cells.

According to a particular embodiment of the invention, the batteries are configured as round cells. Round cells have a cylindrical body with end terminals arranged on the opposite side surfaces. Within a battery arrangement, round cells have the advantage over a conventional cuboid coffee-bag cell that, within a cell arrangement, cavities between the round cells are present due to their geometry. These cavities are particularly advantageous when a malfunction within the battery occurs, in which one or more battery cells burst or even explode. In a conventional battery assembly with one or more coffee-bag cells, there is no space within the battery in which the bursting or exploding batteries may expand. The excess energy cannot be dissipated, resulting in a battery array with many cells which, in the worst case, is threatened by an explosion of the entire battery. In a cell arrangement based on round cells, this risk is significantly reduced.

According to a particular embodiment of the invention, in the cell assembly, at least one positioning plate is arranged, through which the battery cells of the battery section are passed, wherein the positioning plate has at least one recess for passing through at least one battery cell, and wherein the recess is defined by an envelope around the battery cells of the battery section, wherein the recess engages around the at least one battery cell in a form-fit to position and stabilize at least one battery cell within the battery. Herein, an edge surface of the recess not necessarily touches all battery cells that are passed through the recess. Also on battery cells that are not touched of a side surface of the recess, indirectly a stabilizing effect is exerted by adjacent battery cells, which abut directly on a side surface of the recess. The positioning plate may be made of metal, plastic, wood or other material. The positioning plate may alternatively not only have a recess, but a contiguous surface having a plurality of recesses, wherein through each recess at least one battery cell is passed through, and wherein each recess is defined by an envelope around the at least one battery cell passed there through, so that the recess positively engages the at least one battery cell to position and stabilize the at least one battery cell within the battery.

It is beneficial if on each contacting section element, on both sides in each case a positioning plate is arranged. As a result, the battery cells are particularly well stabilized in the areas of the battery in which they contact the contacting section elements. In particular, if the contacting section elements have specially configured contacting section, at which it to be contacted, such an arrangement of the positioning plates is advantageous. The positive end terminals and the negative end terminals can then be positioned particularly precisely in the area of the contacting section elements.

Preferably, at least one contacting section element is thermally conductively connected to a heat sink via a heat dissipation element. The heat sink should be outside the battery, but may also form part of the battery. By a suitably arranged heat dissipation element, a heat flow can be dissipated from the cell arrangement.

The cell arrangement can be surrounded by a thermally conductive housing according to the invention. As the housing is thermally conductive, it is useful as a heat sink to absorb heat from the cell assembly and optionally transmit it to other heat sinks to which it is thermally conductively connected. The previously described heat dissipation element may be connected to the housing thermally conductively. The housing is preferably made of a metal, especially preferably of iron, aluminum, or a metal alloy. Such a housing is suitable for protecting the cell assembly from external influences. The housing preferably has two openings onto which the pressure plates are placed. The housing may have elongated recesses as ventilation slots according to the invention.

The contacting section element may be formed as a metal body according to the invention. It is particularly preferred if the metal body is made of copper or aluminum. Metal bodies have excellent electrical and thermal conductivity. A plurality of battery cells can be connected in parallel and in series by a metal body. The contacting sections on the metal body need not have a particular configuration. According to the invention, however, they may be configured as elevations or may comprise elevations. The metal body may be plate-shaped or may have a step-like surface. Deviating geometric configurations of the metal body are also possible according to the invention.

According to a further embodiment of the invention, the contacting section element is formed as a conductor structure element partially made of a non-electrically conductive material, the conductor structure element having each on a first side and on a second side at least one electrically and thermally conductive contacting section, and wherein each contacting section is electrically and thermally conductively connected to each other contacting section. For this purpose, according to the invention, in the non-electrically conductive material of the contacting section element, electrically and thermally conductive materials may be embedded. The conductor structure element allows for making an electrical and thermal connection of the battery cells. When the contacting section element is configured as a conductor structure element, it is especially advantageous if the battery cells of the battery are pressed with a comparatively high force to this, so that a particularly good electrically and thermally conductive connection between the battery cells and the contacting section element arises. The conductor structure element may be a circuit board. However, it may also be an element being configured spatially differently. Hence, the conductor structure element according to the invention may have a cuboid shape or another shape.

According to the invention, in the non-electrically conductive material of the conductor structure element, a core made of an electrically and thermally conductive material may be arranged, wherein on the sides of the non-electrically conductive material facing away from the core in each case the at least one contacting section is arranged, and wherein at least one electrically and thermally conductive lead-through element extends through the core and through the non-electrically conductive material arranged on both sides of the core, wherein the lead-through element is electrically insulated from the core and is electrically conductively connected to the at least one contacting section on the first side and to the at least one contacting section on the second side, such that an electrically and thermally conductive connection of the contacting sections on the first side to the contacting sections on the second side is produced vie the lead-through element and a heat flow can be picked up and dissipated from the conductor structure element by means of the core. Thus, in a battery with such conductor structure element not only an electric current and a heat flow are distributed in the cell assembly of the battery, but can also be absorbed by the core. This makes it possible to dissipate the heat flow from the conductor structure element and thus also from the cell assembly via the core. According to the invention, the core can be led out of the conductor structure element and connected in a thermally conductive manner to a heat sink. Alternatively, the thermally conductive core may be connected a heat dissipation element, which is thermally conductively connected to a heat sink.

The battery may be further configured such that at least two contacting sections and an electrically and thermally conductive connecting section are arranged on the first side of the conductor structure element, which connecting section electrically and thermally conductively connects the contacting sections on the first side to each other, that each contacting section on the first side is associated with an electrical fuse, and that the connecting section is connected to each contacting section via an electrical fuse associated with this contacting section, wherein the connecting section is connected with the at least one contacting section on the second side electrically conductively through the non-conducting material of the conductor structure element via an electrically conductive lead-through element, such that each contacting section on the first side is secured to each other contacting section on the first side of the conductor structure element and to each contacting section on the second side of the conductor structure element by at least one electrical fuse. Thus, the battery cells may be secured against each other by means of the conductor structure element. This is particularly advantageous if a resistance of a battery cell collapses due to a fault, so that too high a current flows through this battery cell. In this case, an electrical fuse is triggered, which is associated with a contacting section of the conductor structure element, which is electrically and thermally conductively connected to a positive or negative end terminal of this battery cell. As a result, this defective battery cell is electrically isolated from the cell arrangement.

Preferably, under each contacting section of the conductor structure element, an elastic material is arranged, which is elastically deformable under the action of a contact pressure on the contacting section. According to the invention, the elastic material may be arranged in the non-conductive material of the conductor structure element under the contacting section. If a pressing force is exerted on the contacting section, both the contacting section and the elastic material are deformed. Thus, it is possible to establish a particularly good electrically and thermally conductive connection between a contacting section and a battery cell. Due to the local deformation of the conductor structure element, its undesired deformation in other sections or even damage to the conductor structure element may be avoided when battery cells are pressed to the contacting sections. According to an alternative embodiment, a material from which the contacting section is made is elastic. Thus, a contacting section of the conductor structure element may be formed of an elastic material which is electrically and thermally conductive.

It is further preferred if the contacting section element, in particular when it is configured as a conductor structure element, has spring elements at its contacting sections. The spring elements may consist of an electrically and thermally conductive material, for example of a metal. The spring elements are electrically and thermally conductively connected to the contacting sections of the contacting section element. Due to the chosen material and their structure, the spring elements are elastically deformable. The spring elements may, according to possible embodiments of the invention, be coil springs or springs made from a sponge-like material or made of an elastic fabric. They serve to establish an improved contact between the battery cells of the battery and the contacting section element. In addition, they allow a balancing of the contact forces between the battery cells and the contacting section elements within the battery, so that an undesirable sectional deformation of the contacting section element is prevented. Furthermore, a more uniform contact pressure on all battery cells of a battery section is made when the cell assembly is pressed together. This is desirable, as electrical and thermal transition resistances between the battery cells and the contacting section elements are reduced.

BRIEF DESCRIPTION OF THE DRAWINGS

Further embodiments of the invention are shown in the drawings. Herein.

DETAILED DESCRIPTION

Figure 1:
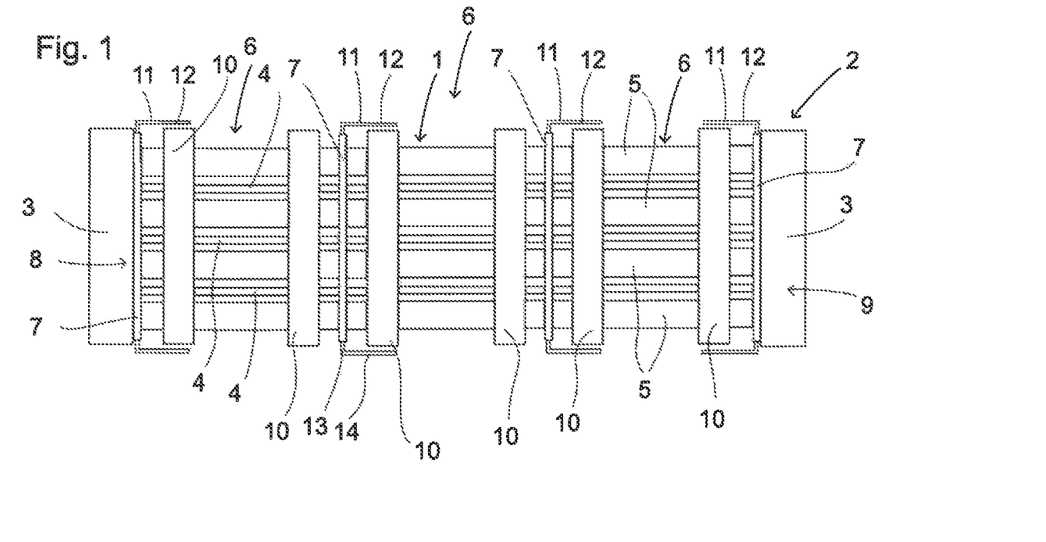
FIG. 1 is a schematic representation of a cell arrangement of a battery according to the invention.

FIG. 1 shows a schematic representation of a cell arrangement 1 of a battery 2. The battery 2 has pressure plates 3 and tension elements 4. In the cell arrangement, a plurality of battery cells 5 are each arranged side by side in a battery section 6. The battery cells 5 arranged in a battery section 6 are connected in parallel with each other. A parallel connection of the battery cells 5 is made possible by means of contacting section elements 7. For this purpose, end terminals of the battery cells 5 are electrically and thermally conductively connected to the contacting section elements 7. Due to the structure of the cell arrangement 1, an electric current and a thermal current can be distributed particularly well over the entire cell arrangement 1.

The contacting section members 7 are each arranged between two battery sections 6. Every battery section 6 has a height of seven battery cells 5. Battery cells 5 of adjacent battery sections 6 are connected in series by the contacting section elements 7 arranged between them. The battery cells 5 in the cell assembly 1 are thus interconnected with each other both in parallel and in series.

A battery start region 8 and a battery end region 9 are formed by positive end terminals or negative end terminals (not shown) of battery cells 5 in the battery 2. The battery start region 8 and battery end region 9 are connected to outer contacting section elements 7. The outer contacting section elements 7 connect the end terminals of the battery cells 5 electrically and thermally conductively. On a side of the contacting section elements 7 facing away from the battery start region 8 and the battery end region 9, respectively, a pressure plate 3 is arranged. The pressure plate 3 is made of copper. Thus, it has very high thermally conductivity.

The pressure plates 3 are connected to each other by means of the tension elements 4. The tension elements 4 are herein bolted into the pressure plates 3 in such a way that they exert a tensile force on the pressure plates 3. As a result, the cell assembly 1 is pressed together. In particular, the battery cells 5 are pressed to the contacting section elements 7. As a result, a contact area is increased between the end terminals of the battery cells 5 and the contacting section elements 7, so that an electric and a thermal current may flow better between the battery cells 5 and the contacting section elements 7 and may thus also be distributed better over the entire cell assembly 1. This contributes to avoid local thermal hot spots within the battery 2. Furthermore, due to the invention, caused by the tension elements 4 and the pressure plates 3 pressing together the cell arrangement 1, the battery 2 of the invention is particularly resistant to mechanical stresses.

In order to ensure that the battery cells 5 are securely held within the cell assembly 1, the battery cells 5 are enclosed by a plurality of positioning plates 10. The positioning plates 10 enclose the battery cells 5 in the battery sections 6 in a form-fitting manner. As a precise contacting of the end terminals of the battery cells 5 is necessary on the contacting section elements 7, the positioning plates 10 are here arranged in the vicinity of the contacting section elements 7.

The contacting section elements 7 are conductor structure elements, which in the present case are configured as planar circuit boards. The circuit boards have a core 11 which is led out laterally from the circuit boards. Outside the circuit board, the core 11 forms a heat dissipation element 12. Heat can be dissipated from the cell arrangement 1 via the heat dissipation element 12. The heat dissipation element 12 has a first planar section 13, which is located in a plane of contacting section element 7, and a second planar section 14 which lies in a further plane, which is arranged perpendicular to the plane of contacting section element 7. The second planar section 14 is adapted to be thermally conductively connected to a housing (not shown) or to a heat sink (not shown) so that a heat flow may be dissipated from the contacting section 7 to the housing or to the heat sink.

Figure 2:
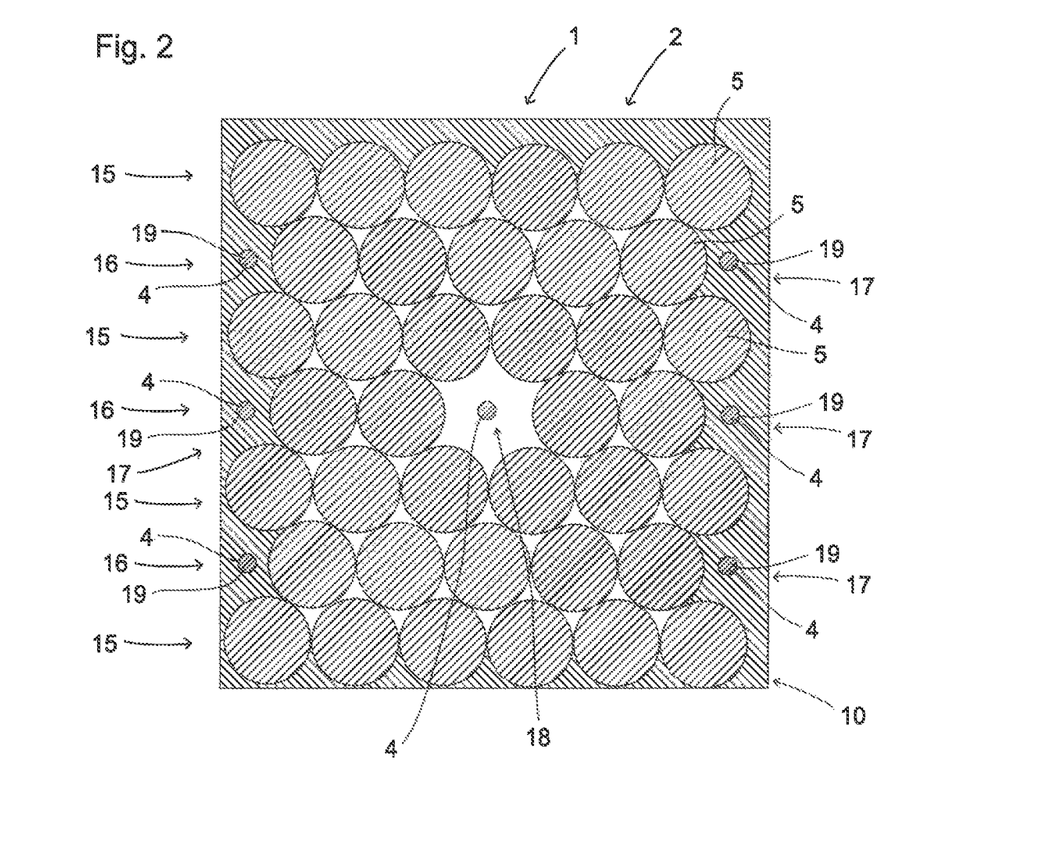
FIG. 2 is a schematic representation of a portion of the cell assembly of the battery of FIG. 1 in a sectional view.

FIG. 2 shows a schematic illustration of a section of the cell arrangement 1 of the battery 2 according to FIG. 1 in a sectional view. In this case, the battery cells 5 are arranged in first cell planes 15 and second cell planes 16. The battery cells 5 in this case directly adjoin one another. The second cell planes 16 each have one battery cell 5 less than the first cell planes 15. This results in outer passage sections 17. By means of the outer passage sections 17, tension elements 4 may be passed through. The outer passage sections 17 allow for arranging as many battery cells 5 as possible on cross-sectional area of a cell assembly 1 that is as small as possible. In this way, two passage sections 17 are formed in the second cell plane 16, the second cell plane 16 having only one battery cell 5 less than the adjacent first cell planes 15. By the removal of a battery cell 5 from the second cell plane 16 two outer passage sections 17 are formed. Through each outer passage section 17, one or more tension elements 4 may be passed through. In the present case, one tension element 4 is passed through each outer passage section 17. In order to achieve a uniform stabilization of the cell assembly 1, however, an internal passage section 18 is provided, in which no battery cell 5 is arranged in the present case. Through the inner passage section 18, a tension element 4 is passed through.

The battery cells 5 are enclosed in the battery section 6 by a positioning plate 10. In the positioning plate 10, tension element recesses 19 are provided, through which the tension elements 4 are passed through into the outer passage sections 17.

Figure 3:
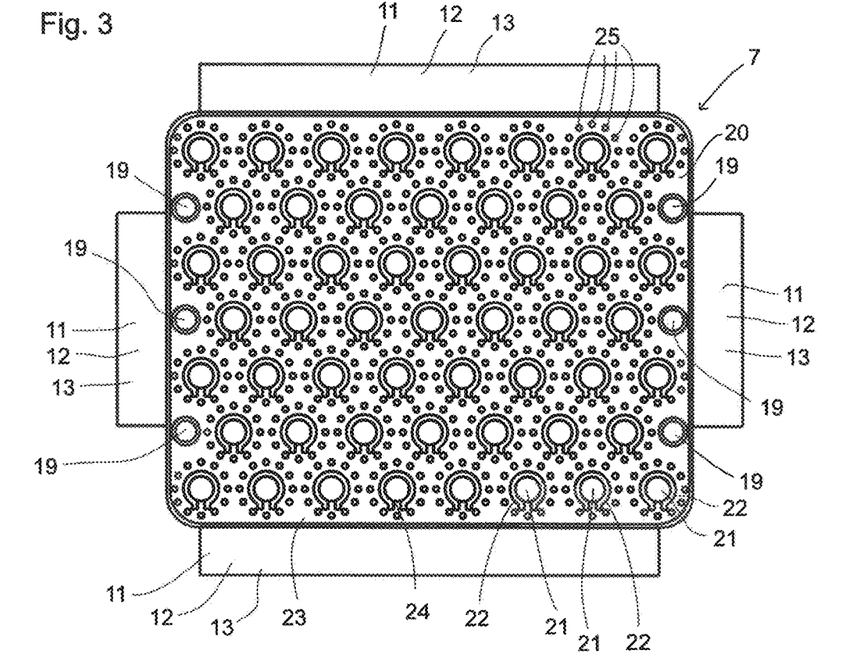
FIG. 3 is a schematic illustration of a contacting section element embodied as a circuit board in a view of a first side of the contacting section element.

FIG. 3 shows a schematic representation of a contacting section element 7 embodied as a circuit board in a view of a first side 20 of the contacting section element 7. In the present case, a contacting section element 7 for a cell arrangement with battery cells arranged in first cell planes and second cell planes is provided. The contacting section element 7 is herein suitable for cell arrangements with four first and three second cell planes, wherein in the first and second cell planes, eight and seven battery cells are arranged, respectively. The contacting section element 7 has tension element recesses 19, through which the tension elements may be passed through.

The contacting section element 7 is partially formed of an electrically nonconductive material. On the first side of the non-electrically conductive material of the contacting section element 7, copper is applied in areas as an electrically and thermally conductive material. The copper material has several contacting sections 21. These are configured for contacting the end terminals of the battery cells. For this purpose, the contacting sections 21 are configured as elevations. The contacting sections 21 are separated by insulating sections 22 of a non-electric conductive material from a connecting section 23. The connecting section 23 is planar. It electrically and thermally conductively connects the contacting sections 21 to each other. Through each insulation section 22, an electrically and thermally conductive track 24 is passed, which is dimensioned as a fuse. Thereby be the contacting sections 21 electrically secured against each other.

Around each insulation section 22 and thus also around each contacting section 21, several lead-through recesses 25 are arranged in a circular shape. In each lead-through recess 25, a lead-through element (not shown) is arranged, which is applied to the lead-through recess 25. The lead-through element is made of copper and electrically and thermally conductively connects the connecting section 23 of the first side 20 of the contacting section element 7 with a second side (not shown) of the contacting section element 7. A current flowing from a battery cell in a contacting section 21 may thus be conducted via the conductive track 24 and the contacting section element to the second side of the contacting section element 7.

In the contacting section element 7, a core 11 made of aluminum is arranged. The core 11 is electrically isolated from the contacting sections 21 and of the lead-through elements. The core extends partially laterally into regions outside the contacting section element 7. In these areas outside the contacting section element 7, the core 11 forms a heat dissipation element 12. In the present case, four heat dissipation elements 12 are each shown with a first areal section 13. Also on the second side of the contacting section elements 7, the previously described tension element recesses 19 are visible, through which the tension elements 4 may be passed through.

Figure 4:
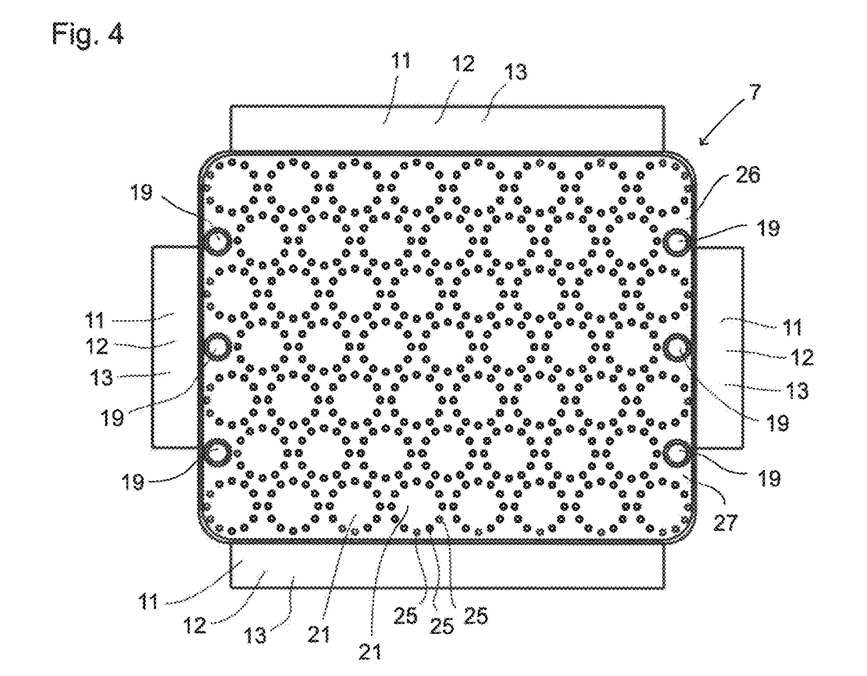
FIG. 4 is a schematic representation of the contacting section element according to FIG. 3 in a view of a second side of the contacting section element.

FIG. 4 shows a schematic representation of the contacting section elements 7 of FIG. 3 in a view on a second side 26 of the contacting section element 7. On the second side 26 of the contacting section elements 7, copper layer is formed as a connecting and contacting region 27. In the connection and contacting region 27, contacting sections 21 are arranged, which are suitable for contacting the end terminals of battery cells. Around each contacting section 21, several lead-through recesses 25 are arranged in a circular shape. The lead-through recesses 25 in the contacting section element 7 are configured as described above.

In the present case, furthermore, the four heat dissipation elements 12 are each shown with a first areal section 13. Also on the second side of the contacting section element 7, tension element recesses 19 are visible, through which the tension elements 4 may be passed through.

Figure 5:
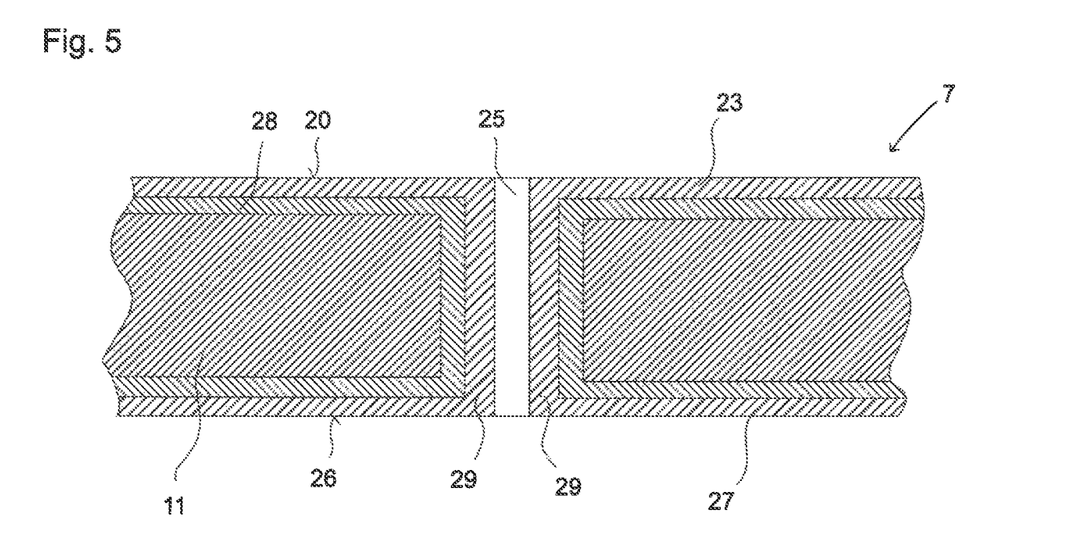
FIG. 5 is a schematic representation of a cross-section of a contacting section element configured as circuit board with a lead-through recess.

FIG. 5 shows a schematic representation of a cross-section of a contacting section element 7 configured as circuit board with a lead-through recess 25. The contacting section element 7 is merely shown in regions. The contacting section element 7 has an electrically non-conductive substrate material 28. The substrate material 28 encloses a core 11 made of copper. On a first side 20 of the contacting section element 7, a copper layer forms a connecting section 23. On a second side 26 of the contacting section element 7, a copper layer forms a connection and contacting region 27. A lead-through recess 25 is passed though the contacting section element 7. It passes through the connecting section 23 and the connection and contacting region 27. On the edge of lead-through recess 25, a lead-through element 29 made of copper is applied in areas as a thin layer. The lead-through element 29 is thereby electrically insulated from the core 11 by the substrate material 28. However, a heat flow may flow through the substrate material 28 and may be dissipated by the core 11 of the contacting section element 7.

Figure 6:
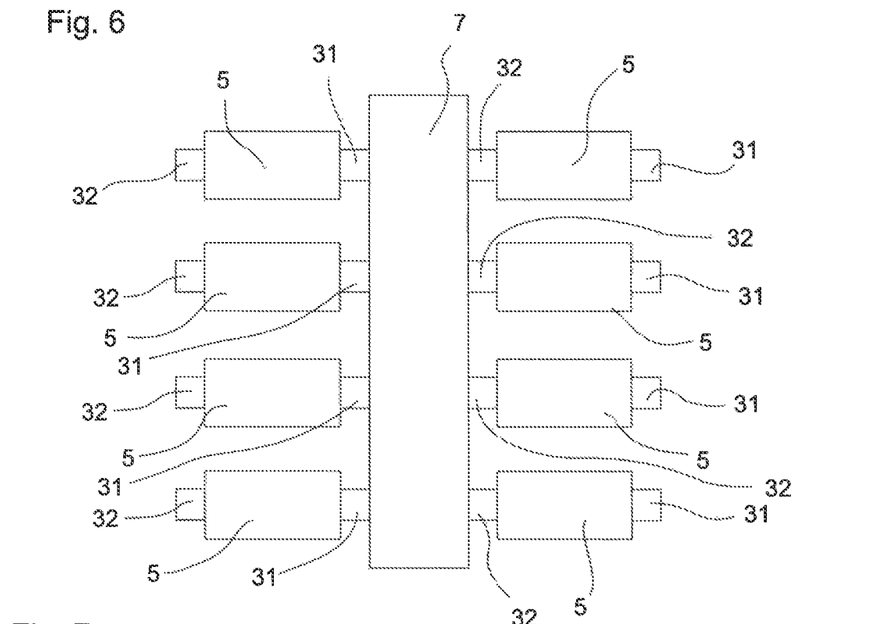
FIG. 6 is a schematic representation of a planar-shaped contacting section element with adjoining battery cells in a side view.

FIG. 6 shows a schematic representation of a planar-shaped contacting section element 7 with adjoining battery cells 5 in a side view. The battery cells 5 have positive end terminals 31 and negative end terminals 32. Positive end terminals 31 and negative end terminals 32 of the battery cells 5 are electrically and thermally conductively connected to the contacting section element 7. For this, they abut to contacting sections (not shown) on the first side and on the second side of the contacting section element 7. According to the illustrated embodiment of the contacting section element 7, the contacting sections connected to positive end terminals 31 lie in a common plane. The contacting sections connected to negative end terminals 32 also lie in a common plane.

Figure 7:
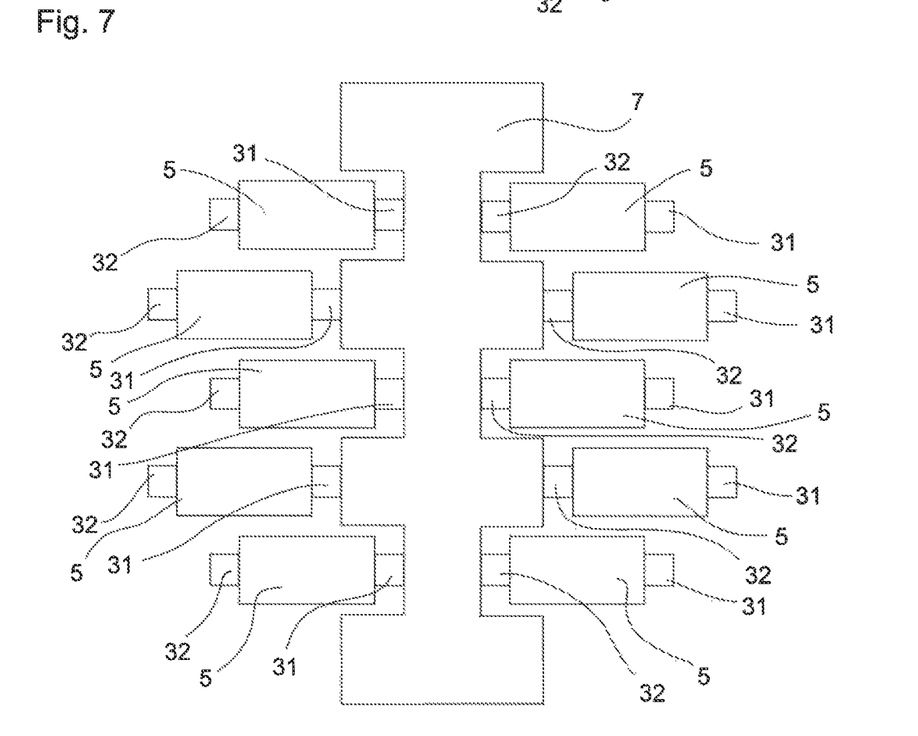
FIG. 7 is a schematic representation of a contacting section element with step-like surfaces with adjacent battery cells in a side view.

FIG. 7 shows a schematic representation of a contacting section with step-like surfaces with adjoining battery cells in a side view. The battery cells 5 have positive end terminals 31 and negative end terminals 32. Positive end terminals 31 and negative end terminals 32 of the battery cells 5 are electrically and thermally conductively connected to the contacting section element 7. For this, they abut to contacting sections (not shown) on the first side and on the second side of the contacting section element 7. According to the illustrated embodiment of the contacting section element 7, the contacting sections connected to positive end terminals 31 lie in two different planes, as the first side of the contacting section element 7 is formed step-like. The contacting sections connected to negative end terminals 32 also lie in two different planes, as the second side of the contacting section element 7 is formed step-like.

Figure 8:
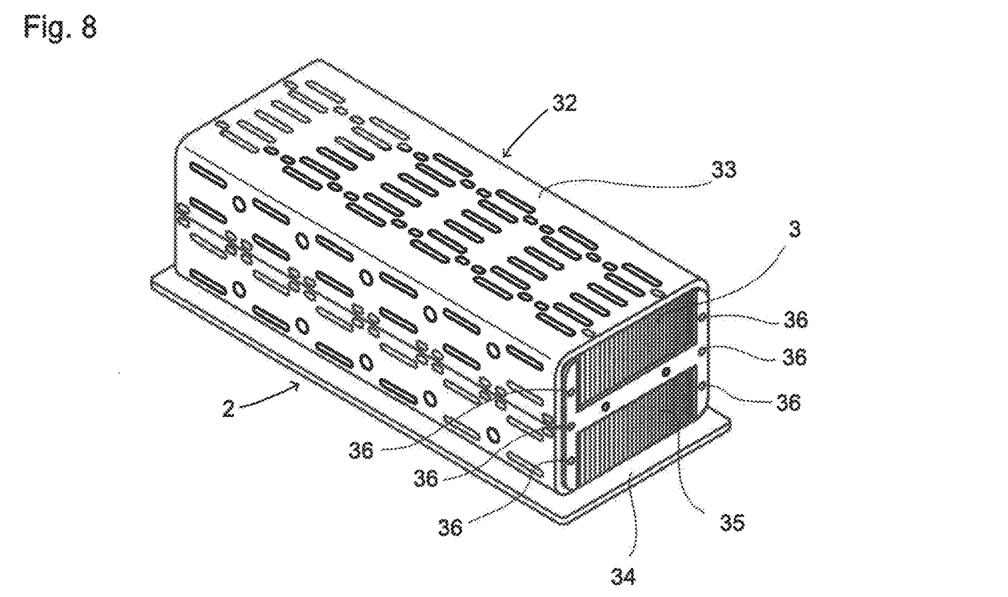
FIG. 8 is a schematic representation of a battery according to the invention with a housing.

FIG. 8 shows a schematic representation of a battery 2 according to the invention with a housing 33. The housing 33 is made of aluminum and encloses a cell arrangement according to the invention with contacting section elements. In this case, inside housing 33, heat dissipation elements are connected to the housing 33, such that a heat flow may be dissipated from the cell assembly to the housing 33. The housing 33 is fixedly connected to a retaining plate 34, which serves as a heat sink. The housing 33 is closed by pressure plates 3 at two end faces. The pressing plates 3 have cooling fins 35, such that the pressing plates 3 contribute to cooling the cell assembly within the housing 35. Tension elements (not shown) are passed through the pressure plates 3 and are bolted to the pressure plates 3 by means of nuts 36. The pressure plates 3 are electrically isolated from the tension elements.

Figure 9:
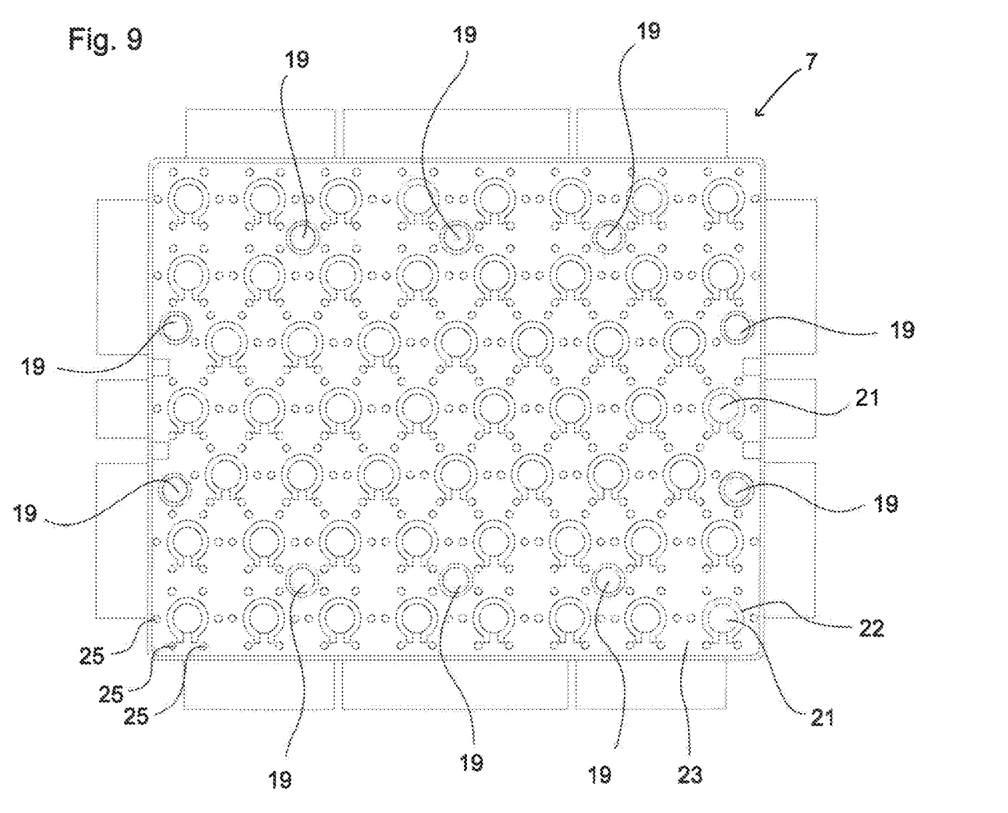
FIG. 9 is a schematic illustration of a contacting section element configured as a circuit board with a circular array of tension element recesses in a view of a first side of the contacting section element.

FIG. 9 shows a schematic representation of a contacting section element 7 configured as a circuit board with a circular arrangement of tension element recesses 19 in a view onto a first side of the contacting section element 7. The contacting section element comprises contacting sections 21, insulating sections 22, a connecting section 23 and lead-through recesses 25, which are formed as in the contacting section element 7 of FIG. 3. The contacting section element 7 further comprises tension element recesses 19. The tension element recesses 19 are arranged substantially circularly in the contacting section element 7. It has been found that in such an arrangement, forces on the contacting section element 7 may be distributed more uniformly as compared to the tension element recesses 19 only being arranged in edge regions of the contacting section element 7. By the shown arrangement of the tension element recesses 19, it is avoided that the contacting section element 7 bends when pressing the cell arrangement together. A bending could result in individual cell within the cell assembly being contacted more poorly or being not contacted at all. The illustrated arrangement of tension element recesses 19 is thus particularly advantageous.

Figure 10:
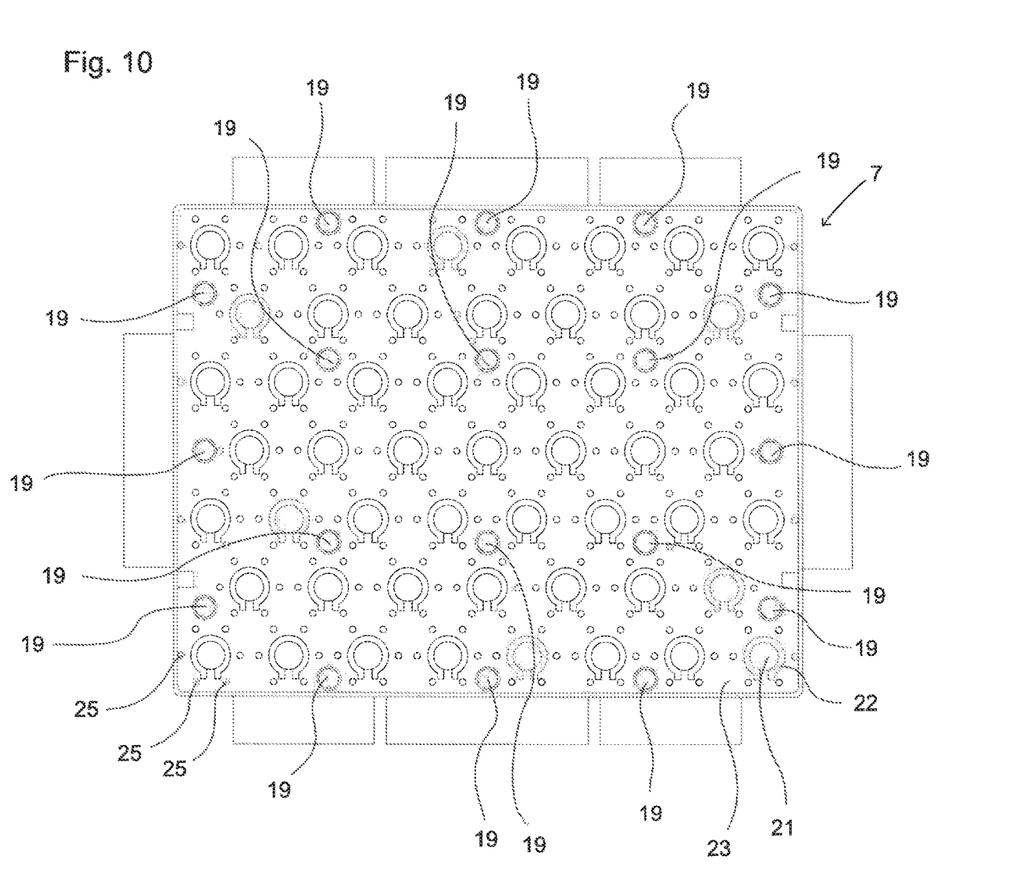
FIG. 10 is a schematic illustration of a contacting section element configured as a circuit board with a circular array of tension element recesses in a view of a first side of the contacting section element.

FIG. 10 shows a schematic representation of a contacting section element 7 configured as a circuit board with a distributed arrangement of tension element recesses 19 in a view on a first side the contacting section element 7. The contacting section element 7 comprises contacting sections 21, insulating sections 22, a connecting section 23 and lead-through recesses 25, which are formed as in the contacting section element 7 of FIG. 3. The contacting section element 7 further comprises tension element recesses 19. The tension element recesses 19 are arranged distributed in the contacting section element 7. It has been found that in such an arrangement, forces on the contacting section element 7 may be distributed more uniformly as compared to the tension element recesses 19 only being arranged in edge regions of the contacting section element 7. By the shown arrangement of the tension element recesses 19, it is avoided that the contacting section element 7 bends when pressing the cell arrangement together. A bending could result in individual cell within the cell assembly being contacted more poorly or being not contacted at all. The illustrated arrangement of tension element recesses 19 is thus advantageous.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A battery comprising a cell arrangement, wherein the cell arrangement has a plurality of battery cells, wherein the cell arrangement has at least two battery sections and each battery section consists of a plurality of battery cells, wherein each battery cell has a first and a second end terminal and wherein between the first and the second end terminal of each battery cell a battery cell longitudinal axis extends, wherein the battery cell longitudinal axes of each battery section are each arranged parallel to each other, and wherein the battery sections are arranged adjacent to each other, wherein between at least two adjacent battery sections, an at least partially electrically and thermally conductive contacting section element having a first side and a second side is arranged, that has each on the first side and on the second side at least one electrically and thermally conductive contacting section, wherein the battery sections are arranged relative to each other such that to each battery section a plane can be assigned that extends perpendicular to the battery cell longitudinal axes of the battery cells of the battery section through at least one of the battery cells of the battery section, and wherein battery sections adjacent to the battery section are not intersected by this plane, wherein the end terminals facing the first side of that contacting section element are electrically and thermally conductively connected to the at least one contacting section of this first side, wherein the end terminals facing the second side of this contacting section element are electrically and thermally conductively connected to the at least one contacting section of this second side, and wherein end terminals of the battery cells are electrically and thermally conductively connected to each other via the contacting section element such that an electric current and a heat flow are distributed throughout the entire cell assembly, wherein the contacting section element is formed as a conductor structure element partially made of a non-electrically conductive material, the conductor structure element having each on a first side and on a second side at least one electrically and thermally conductive contacting section, and wherein each contacting section is electrically and thermally conductively connected to each other contacting section, wherein in the non-electrically conductive material of the conductor structure element, a core made of an electrically and thermally conductive material is arranged, wherein on the sides of the non-electrically conductive material facing away from the core in each case the at least one contacting section is arranged, and wherein at least one electrically and thermally conductive lead-through element extends through the core and through the non-electrically conductive material arranged on both sides of the core, wherein the lead-through element is electrically insulated from the core and is electrically conductively connected to the at least one contacting section on the first side and to the at least one contacting section on the second side, such that an electrically and thermally conductive connection of the contacting sections on the first side to the contacting sections on the second side is produced via the lead-through element and a heat flow can be picked up and dissipated from the conductor structure element by means of the core.

2. The battery according to claim 1, wherein the end terminals connected to the at least one contacting section of the first side are interconnected electrically and thermally conductively with one another via the contacting section element, wherein the end terminals connected to the at least one contacting section of the second side are interconnected electrically and thermally conductively with one another via the contacting section element, and wherein the end terminals connected to the at least one contacting section of the first side are electrically and thermally conductively interconnected connected to the at least one contacting section of the second side via the contacting section element, such that the battery cells are electrically conductively connected to each other in an electrical series and parallel connection.

3. The battery according to claim 1, wherein adjacent battery sections are spaced apart from one another in the direction of a battery cell longitudinal axis of one of the adjacent battery sections.

4. The battery according to claim 1, wherein the battery cells of adjacent battery sections are arranged such that at least one axis extending through a battery cell of a battery section, which axis extends parallel to a battery cell longitudinal axis of this battery cell, intersects a battery cell in an adjacent battery section.

5. The battery according to claim 1, wherein the battery cells of adjacent battery sections abut opposite of each other to a contacting section element.

6. The battery according to claim 1, wherein the battery cells of all battery sections of the battery have battery cell longitudinal axes aligned parallel to each other.

7. The battery according to claim 6, wherein the battery sections of the battery are arranged one behind the other along a battery axis, which runs parallel to the battery cell longitudinal axes.

8. The battery according to claim 7, wherein all battery sections of the battery lie in a battery compartment, wherein a battery compartment cross-section of the battery compartment perpendicular to the battery axis corresponds to a maximum battery section cross-section of a battery section envelope of a battery section perpendicular to the battery axis, wherein the maximum battery section cross-section is the battery section cross-section of a battery section that includes all battery section cross-sections of all battery sections along the battery axis.

9. The battery according to claim 1, wherein the first end terminals of the battery cells form battery plus terminals and the second end terminals of the battery cells form battery minus terminals, wherein the battery cells of a battery section are each connected to a contacting section element exclusively via battery plus terminals or exclusively via battery minus terminals.

10. The battery according to claim 1, wherein the contacting section element is configured plate-shaped.

11. The battery according to claim 1, wherein the contacting section element has flat sections which are arranged stepwise offset from each other on the contacting section element.

12. The battery according to claim 1, wherein a pressure plate is arranged at each of a battery start region and a battery end region of the cell arrangement, wherein the pressure plates are connected to each other via tension elements, and thereby the battery cells abutting to the at least one contacting segment element are pressed to the at least one contacting segment element, and wherein the battery start region and the battery end region are defined by end terminals at a first end and a second end of the cell assembly.

13. The battery according to claim 7, wherein the battery cells in the battery sections are arranged in first and second cell planes, wherein the first and the second cell planes are arranged alternately within a battery section, wherein along each cell plane at least two battery cells are arranged, wherein between adjacent battery cells in the first cell plane and adjacent battery cells in the second cell plane an equal distance is predetermined, wherein the battery cells in the first cell plane are arranged offset from the battery cells in the second cell plane, and wherein the battery cells in all battery sections are arranged similarly, such that within the lateral surface at least one outer passage section is formed through which one of the tension elements is passed.

14. The battery according to claim 1, wherein the battery cells abut against two other battery cells in corner regions of the battery sections and on three other battery cells in edge regions of the battery sections, and that all battery cells that are not arranged in a corner region or an edge region abut to six other battery cells.

15. The battery according to claim 1, wherein end terminals of a battery section abut electrically and thermally conductively directly to end terminals of an adjacent battery section.

16. The battery according to claim 1, wherein in the cell assembly, at least one positioning plate is arranged, through which the battery cells of the battery section are passed, wherein the positioning plate has at least one recess for passing through at least one battery cell, and that the recess is defined by an envelope around the battery cells of the battery section, wherein the recess engages around the at least one battery cell in a form-fit to position and stabilize at least one battery cell within the battery.

17. The battery according to claim 16, wherein on each contacting section element on both sides in each case a positioning plate is arranged.

18. The battery according to claim 1, wherein at least one contacting section element is thermally conductively connected to a heat sink via a heat dissipation element.

19. The battery according to claim 18, wherein the cell arrangement is surrounded by a thermally conductive housing.

20. The battery according to claim 19, wherein the heat dissipation element is connected to the housing.

21. The battery according to claim 1, wherein at least two contacting sections and an electrically and thermally conductive connecting section are arranged on the first side of the conductor structure element, which connecting section electrically and thermally conductively connects the contacting sections on the first side to each other, that each contacting section on the first side is associated with an electrical fuse, and that the connecting section is connected to each contacting section via an electrical fuse associated with this contacting section, wherein the connecting section is connected with the at least one contacting section on the second side electrically conductively through the non-conducting material of the conductor structure element via an electrically conductive lead-through element, such that each contacting section on the first side is secured to each other contacting section on the first side of the conductor structure element and to each contacting section on the second side of the conductor structure element by at least one electrical fuse.

* * * * *